United States Patent
Kim

(10) Patent No.: US 8,846,221 B2
(45) Date of Patent: Sep. 30, 2014

(54) BATTERY PACK

(75) Inventor: Tae-Won Kim, Suwon-Si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 585 days.

(21) Appl. No.: 12/242,604

(22) Filed: Sep. 30, 2008

(65) Prior Publication Data

US 2009/0269620 A1    Oct. 29, 2009

(30) Foreign Application Priority Data

Apr. 24, 2008 (KR) .......... 10-2008-0038275

(51) Int. Cl.
  *H01M 2/04* (2006.01)
  *H01M 2/34* (2006.01)
  *H01M 2/06* (2006.01)
  *H01M 10/42* (2006.01)
  H01M 10/058 (2010.01)
  H01M 2/02 (2006.01)

(52) U.S. Cl.
  CPC .......... *H01M 2/347* (2013.01); *H01M 2/0404* (2013.01); *Y02E 60/12* (2013.01); *H01M 2/06* (2013.01); *H01M 2200/00* (2013.01); *H01M 10/425* (2013.01); *H01M 10/058* (2013.01); *H01M 2/0217* (2013.01)
  USPC .......................................... 429/7

(58) Field of Classification Search
  None
  See application file for complete search history.

(56) References Cited

U.S. PATENT DOCUMENTS

| | | | |
|---|---|---|---|
| 6,994,926 B2 * | 2/2006 | Ikeuchi et al. | 429/7 |
| 7,695,835 B2 | 4/2010 | Lim | |
| 8,143,847 B2 | 3/2012 | Kim | |
| 2006/0019160 A1 | 1/2006 | Han | |
| 2006/0057458 A1 * | 3/2006 | O'Dea et al. | 429/164 |
| 2006/0071637 A1 | 4/2006 | Heo et al. | |
| 2006/0215334 A1 | 9/2006 | Hong et al. | |
| 2006/0251930 A1 | 11/2006 | Kim | |
| 2007/0026296 A1 * | 2/2007 | Byun et al. | 429/72 |

FOREIGN PATENT DOCUMENTS

| | | |
|---|---|---|
| CN | 001713416 | 12/2005 |
| CN | 1722505 | 1/2006 |
| CN | 2865003 | 1/2007 |
| JP | 10-064576 | 3/1998 |
| JP | 2005-085543 | 3/2005 |
| JP | 2005-276525 | 10/2005 |
| JP | 2007-049098 A | 2/2007 |
| JP | 2007-172883 | 7/2007 |

(Continued)

OTHER PUBLICATIONS

Office Action dated Mar. 24, 2011 for corresponding Chinese Patent Application No. 200910009336.3 (with English translation).
European Search Report for corresponding EP Application No. 09290143.8, Jun. 24, 2009.
Office Action dated Sep. 21, 2011 for corresponding Chinese Patent Application No. 200910009336.3.

(Continued)

*Primary Examiner* — Patrick Ryan
*Assistant Examiner* — Wyatt McConnell
(74) *Attorney, Agent, or Firm* — Knobbe Martens Olson & Bear LLP

(57) ABSTRACT

Provided is a battery pack, which can prevent easy detachment of a welded part between a cap plate and a case due to external impact, thereby enhancing hermeticity and reliability.

20 Claims, 6 Drawing Sheets

(56) References Cited

FOREIGN PATENT DOCUMENTS

| | | |
|---|---|---|
| JP | 2007-179806 A | 7/2007 |
| JP | 2008-060053 | 3/2008 |
| KR | 1020010039431 | 5/2001 |
| KR | 10-0571241 | 4/2006 |
| KR | 100624952 | 9/2006 |
| KR | 10-2006-0115207 A | 11/2006 |
| KR | 1020070022540 | 2/2007 |
| KR | 1020070035877 | 4/2007 |
| KR | 10-0731462 | 6/2007 |

OTHER PUBLICATIONS

Office Action dated Mar. 2, 2012 for corresponding EP Application No. 09 290 143.8-1227.

Office Action dated May 11, 2012 for corresponding CN Appl No. 200910009336.3.

Office Action dated Jun. 5, 2012 for corresponding JP Appl No. 2009-033496.

\* cited by examiner

BATTERY PACK

CROSS-REFERENCE TO RELATED APPLICATION

This application claims the benefit of Korean Patent Application No. 2008-0038275, filed Apr. 24, 2008, the disclosure of which is hereby incorporated herein by reference in its entirety.

BACKGROUND OF THE INVENTION

1. Field of the Invention

The present invention relates to a battery pack, and more particularly, to a battery pack which can prevent easy detachment of a welded part between a cap plate and a case due to external impact, thereby enhancing hermeticity and reliability.

2. Description of the Related Art

Secondary batteries are rechargeable and can be repeatedly used. Thus, secondary batteries are more economical than disposable batteries.

Also, the secondary batteries can realize high capacity with small volume, so that they are widely used as a driving power source for handheld electronic devices such as cellular phones, notebook computers, camcorders and digital cameras.

In addition, owing to the high capacity of the secondary battery, the secondary batteries are widely used in high power products such as hybrid cars and electric tools as well as handheld electrical appliances.

Such secondary batteries include, for example, nickel-cadmium batteries, nickel-metal hydride batteries, nickel-zinc batteries, lithium ion secondary batteries and lithium polymer secondary batteries.

The lithium secondary batteries are widely used because they are compact and have high capacity, a high operating voltage and a high energy density per unit weight.

The lithium secondary batteries are formed by accommodating an electrode assembly and an electrolyte in a case and sealing the case.

The lithium secondary batteries may be classified into a can type and a pouch type depending on the shape of the case, and the can-type batteries may be classified into a cylindrical type and a rectangular type.

The rectangular-type lithium secondary battery is formed by accommodating an electrode assembly including a positive electrode plate, a negative electrode plate and a separator in a rectangular-type case having an opening at one side, and sealing the opening using a cap assembly.

Here, the cap assembly includes a cap plate disposed at an opening of the case, and an electrode terminal inserted into in the middle of the cap plate.

The case is sealed by welding an edge of the cap plate disposed at the opening using laser to join the cap plate with the case.

Since the rectangular-type secondary battery has the electrode terminal in the middle of the cap plate, the welded part between the cap plate and the case can be easily detached from each other when external impact caused, for example, by the battery being dropped, is concentrated in a part where the electrode terminal is disposed.

Moreover, since there is a hole in the cap plate to insert the electrode terminal into the cap plate, the hole part of the cap plate is more vulnerable to the external impact.

Recently, a rectangular-type secondary battery which has a larger width than a height is being developed. However, when the width is larger than the height, the resistance to damage as a result of external impact applied to the cap plate is relatively weak, so that the cap plate and the case can be more easily detached from each other.

SUMMARY OF THE INVENTION

Aspects of the present invention provide a battery pack which inhibits detachment of a welded part between a cap plate and a case due to external impact, thereby enhancing hermeticity and reliability.

According to an embodiment of the present invention, a battery pack includes: a bare cell; and a protection circuit assembly electrically connected with the bare cell and including a protection circuit board, wherein the protection circuit board includes a protection circuit module, and the protection circuit module is in contact with the bare cell.

The bare cell may include a case having an opening at one side and a cap assembly sealing the case. Here, the cap assembly may include a cap plate coupled to the opening, and edges of the cap plate and the opening may be welded to each other.

The case may include narrow side surfaces facing each other and wide side surfaces facing each other, these side surfaces being laterally connected with each other, and a first surface and a second surface formed by being surrounded by the side surfaces. Here, a distance between the narrow side surfaces facing each other may be larger than a distance between the first and second surfaces.

The protection circuit board may include a printed circuit board, and a protection circuit, a PTC thermistor, an external connection terminal and a connection terminal which are mounted on the printed circuit board, and the protection circuit module may be formed by covering the protection circuit and the PTC thermistor using an encapsulating part.

The encapsulating part may be in contact with the cap plate.

The protection circuit module may be disposed in a middle part of the protection circuit board.

The bare cell may include a welded part formed by welding an edge of the cap plate and an edge of the opening of the case, and the protection circuit module may be disposed on an upper surface of an edge of the cap plate corresponding to the welded part.

The protection circuit module may be disposed in the middle part of the cap plate.

The cap plate may include a terminal through-hole, which is eccentrically disposed with respect to a center of the cap plate.

The terminal through-hole may be spaced ½ to ¾ apart from the center of the cap plate in a major axis direction.

According to another embodiment of the present invention, a battery pack includes a bare cell including a case accommodating an electrode assembly and having an opening at one side and a cap assembly sealing the case, and a protection circuit assembly electrically connected with the bare cell. Here, the case includes narrow side surfaces facing each other and wide side surfaces facing each other, these surfaces being laterally connected with each other, and first and second surfaces formed by being surrounded by the side surfaces. The cap assembly is coupled to the opening and includes a cap plate having a terminal through-hole, a distance between the narrow side surfaces facing each other is larger than a distance between the first and second surfaces, and the terminal through-hole is eccentrically disposed with respect to a center of the cap plate.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1A:
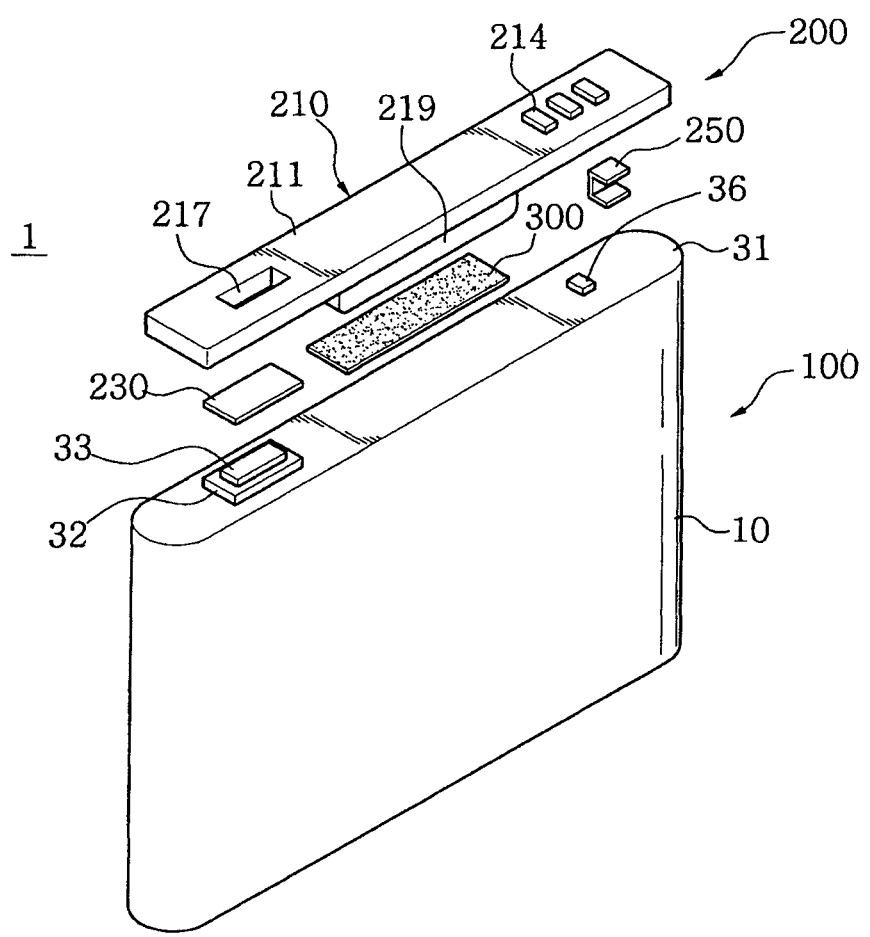
FIG. 1A is an exploded perspective view of a battery pack according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
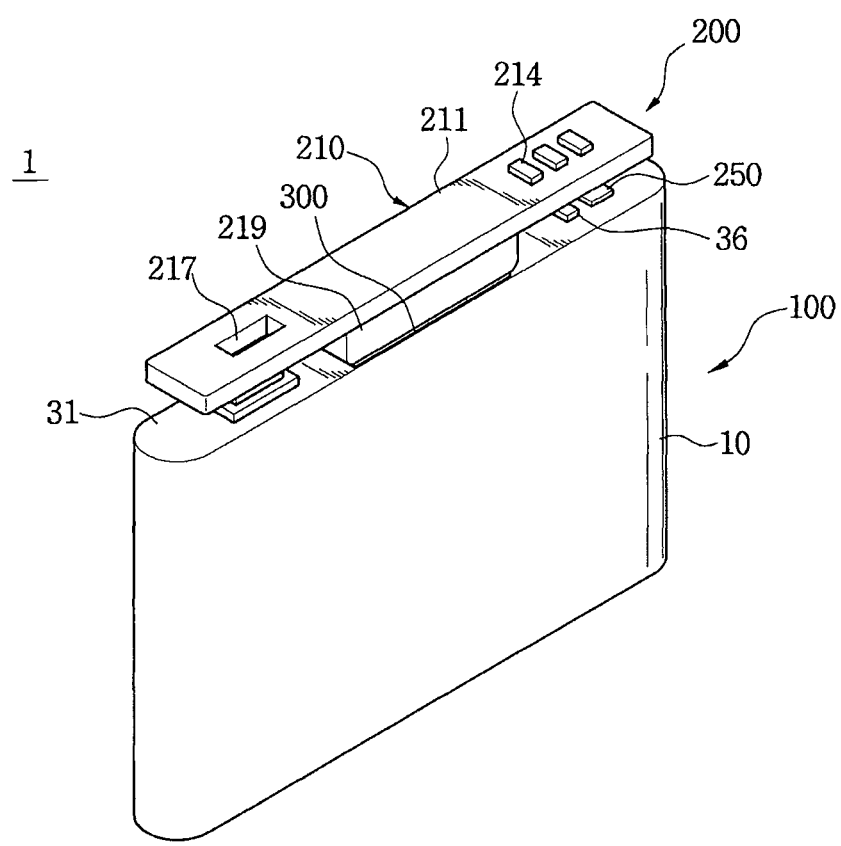
FIG. 1B is an assembled perspective view of the battery pack of FIG. 1A.
Figure 1C:
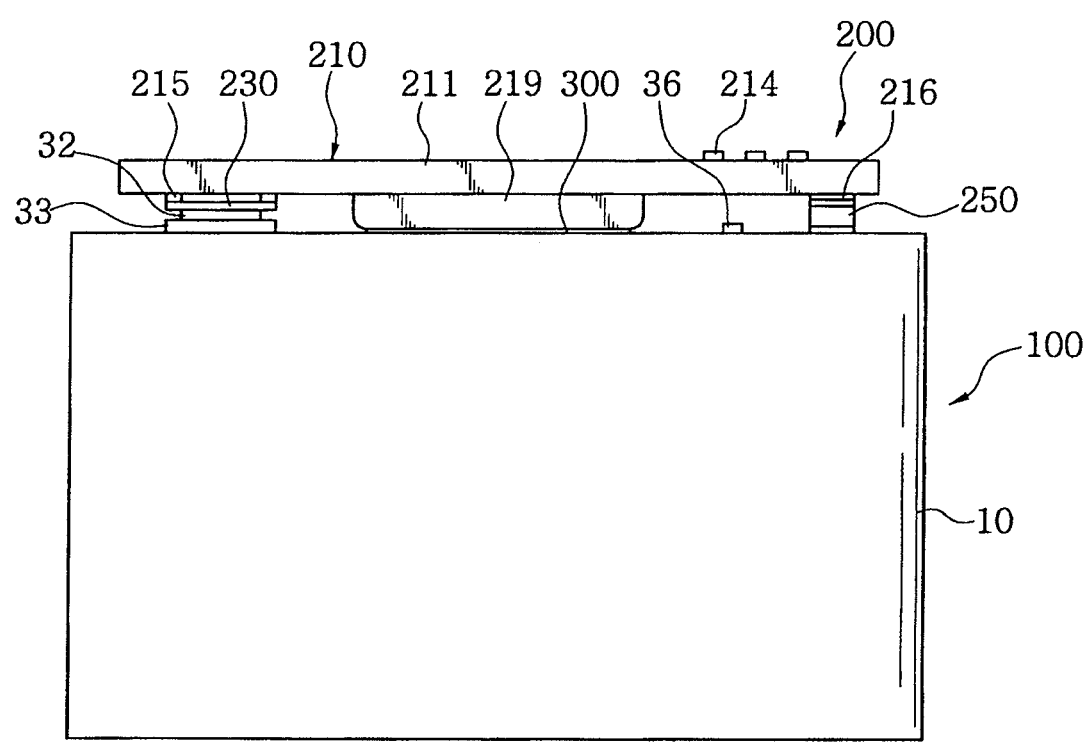
FIG. 1C is a front view of the battery pack of FIG. 1B.

FIGS. 1A and 1B are exploded and assembled perspective views of a battery pack according to an exemplary embodiment of the present invention, respectively, and FIG. 1C is a front view of the battery pack of FIG. 1B.

Figure 2A:
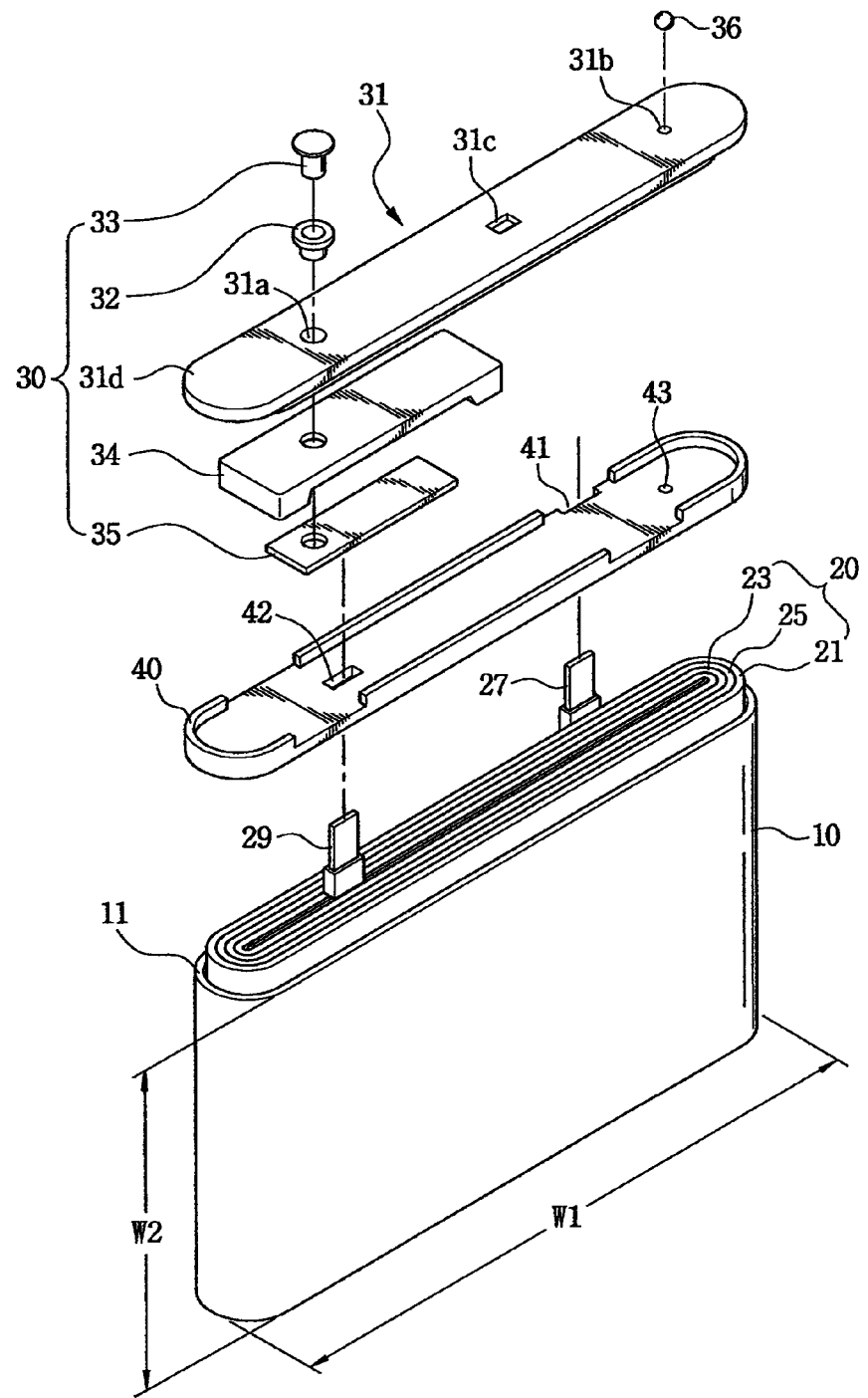
FIG. 2A is an exploded perspective view of a bare cell included in a battery pack according to an exemplary embodiment of the present invention.
Figure 2B:
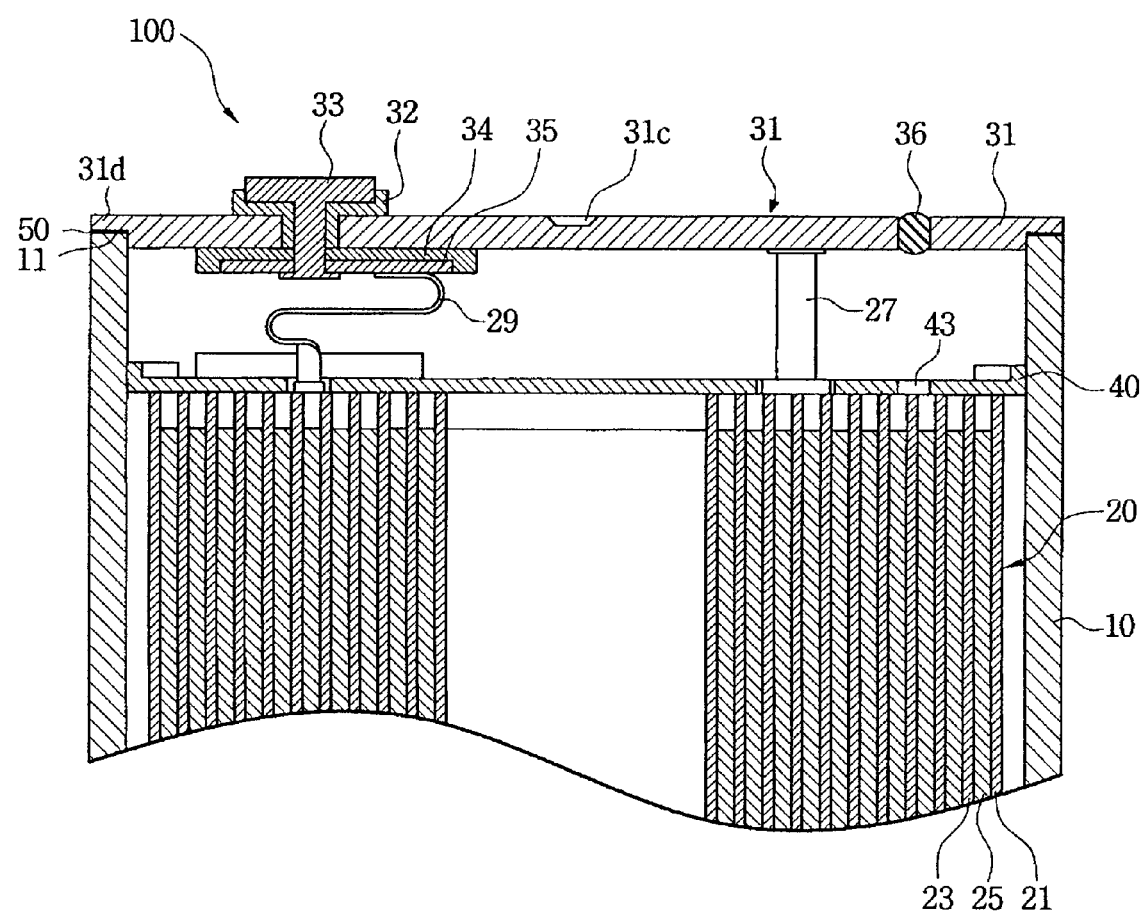
FIG. 2B is an assembled cross-sectional view of the bare cell of FIG. 2A.

FIG. 2A is an exploded perspective view of a bare cell included in a battery pack according to an exemplary embodiment of the present invention, and FIG. 2B is an assembled cross-sectional view of the bare cell of FIG. 2A.

Referring to FIGS. 2A and 2B, the bare cell 100 includes a case 10, an electrode assembly 20 accommodated in the case 10, and a cap assembly 30 sealing the case 10.

The bare cell 100 further includes an insulating case 40 disposed on the electrode assembly 20 accommodated in the case 10.

The bare cell 100 further includes an electrolyte accommodated in the case 10 to help the current flow.

The case 10 may form an appearance of the bare cell 100, which may be formed in a rectangular shape or a rectangular shape having rounded corners, but the present invention is not limited thereto.

Here, one side of the case 10 has an opening for inserting the electrode assembly 20 into the case 10.

To be more specific, the case 10 includes narrow side surfaces facing each other and wide side surfaces facing each other, which are connected with each other.

Among surfaces formed by being surrounded by the four side surfaces, a first surface is open to insert the electrode assembly 20 into the case 10, and a second surface is closed.

Hereinafter, the open first surface is called a top surface of the case 10, and the close second surface is called a bottom surface of the case 10.

A lateral width W1 of the bare cell 100 is a distance between the narrow side surfaces facing each other, and a longitudinal width W2 of the bare cell 100 is a distance between the top surface and the bottom surface.

Here, the lateral width W1 is larger than the longitudinal width W2.

The case 10 may be formed of a metallic material, for example, one selected from aluminum, an aluminum alloy, stainless steel and equivalents thereof.

The electrode assembly 20 includes a first electrode plate 21 and a second electrode plate 23, which have different polarities from each other.

The electrode assembly 20 further includes a separator 25 interposed between the first and second electrode plates 21 and 23, and the separator 25 prevents a short circuit between the two electrode plates 21 and 23.

Hereinafter, the first electrode plate 21 is called a positive electrode plate, and the second electrode plate 23 is called a negative electrode plate.

The positive electrode plate 21 is formed by applying a slurry containing a positive electrode active material to a positive electrode collector, and the negative electrode plate 23 is formed by applying a slurry containing a negative electrode active material to a negative electrode collector.

Each of the positive and negative electrode plates 21 and 23 includes a non-coated portion to which an active material is not applied, and each electrode tab 27 or 29 is attached to the non-coating portion to be electrically connected.

That is, the first electrode tab 27 is electrically connected with the positive electrode plate 21, and the second electrode tab 29 is electrically connected with the negative electrode plate 23.

Hereinafter, the first electrode tab 27 is called a positive electrode tab, and the second electrode tab 29 is called a negative electrode tab.

The cap assembly 30 may include a cap plate 31, an insulating gasket 32, an electrode terminal 33, an insulating plate 34, a terminal plate 35 and an electrolyte inlet plug 36.

The cap plate 31 is disposed at an opening of the case 10 and an edge 31d of the cap plate 31 is joined with an edge 11 of the opening of the case 10 by welding, e.g. laser welding, thereby sealing the case 10.

Therefore, the bare cell 100 includes a welded part 50 formed by welding an edge 31d of the cap plate 31 and an edge 11 of the opening of the case 10, and the case 10 and the cap plate 31 are fixed by the welded part 50.

The cap plate 31 includes a terminal through-hole 31a into which the insulating gasket 32 and the electrode terminal 33 are inserted, and an electrolyte inlet 31b serving as a passage for electrolyte injection.

Here, the terminal through-hole 31a may be eccentrically disposed with respect to the center of the cap plate 31, and may be formed adjacent to an end in a major axis direction.

Thus, the electrode terminal 33 coupled to the terminal through-hole 31a is also eccentrically disposed with respect to the center of the cap plate 31, and a space is formed in the middle of the cap plate 31.

Figure 3:
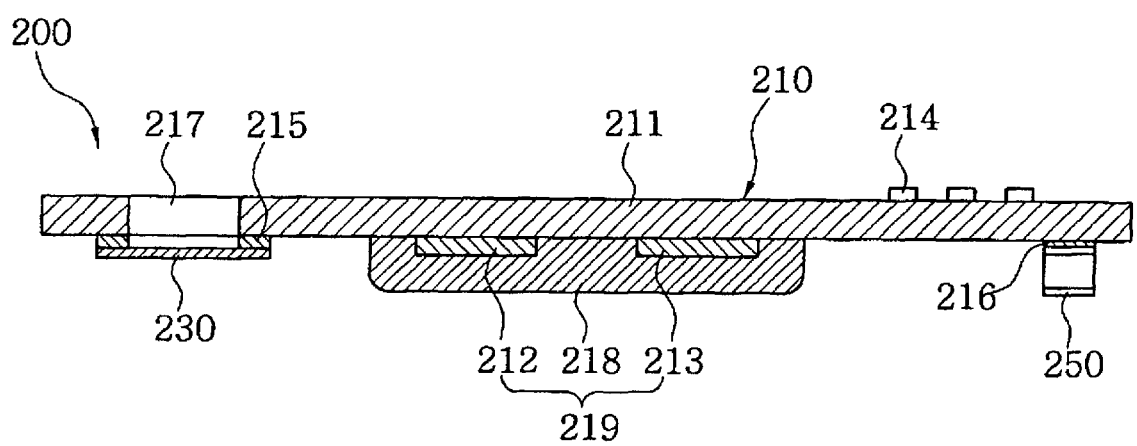
FIG. 3 is an assembled cross-sectional view of a protection circuit assembly according to an exemplary embodiment of the present invention.

As shown in FIG. 3. in the middle of the cap plate 31, a protection circuit 212 and a PTC 213 covered by an encapsulating part 218 to be described later, i.e., a protection circuit module 219 is disposed.

When the terminal through-hole 31a is disposed too close to the end of the cap plate 31 in the major axis direction, a space for elements to be disposed under the cap plate 31 becomes smaller.

Alternatively, when the terminal through-hole 31a is disposed close to the center of the cap plate 31, a space for the protection circuit module 219 becomes smaller.

Thus, the terminal through-hole 31a may be spaced from the approximate center of the cap plate ½ to ¾ of the distance of the cap plate 31 from the approximate center to the approximate end of the cap plate 31 in the major axis direction.

Here, the electrode terminal 33 is also disposed adjacent to the end of the cap plate 31 in the major axis direction, so that impact applied to the electrode terminal 33 can be scattered as compared with when the electrode terminal 33 is disposed in the middle of the cap plate 31.

The cap plate 31 may include a vent 31c which is broken to exhaust a gas when inner pressure of the bare cell 100 is increased, and the vent 31c may include a notch part to facilitate the breakage of the vent 31c.

The insulating gasket 32 is coupled to the terminal through-hole 31a formed in the cap plate 31, and insulates the electrode terminal 33 from the cap plate 31.

In addition, the insulating gasket 32 has a hole in the middle part, and the electrode terminal 33 is positioned in the hole.

A lower part of the electrode terminal 33 is electrically connected with the terminal plate 35 through the cap plate 31.

The insulating plate 34 is disposed under the cap plate 31, and insulates the terminal plate 35 from the cap plate 31.

In addition, the insulating plate 34 has a hole to connect the terminal plate 35 with the electrode terminal 33.

The terminal plate 35 is disposed under the insulating plate 34, and connected with the electrode terminal 33 to form an electrical path.

Further, the positive electrode tab 27 is electrically connected with a bottom surface of the cap plate 31, and the negative electrode tab 29 is electrically connected with a bottom surface of the terminal plate 35.

The insulating case 40 is disposed on the electrode assembly 20 accommodated in the case 10 to prevent movement of the electrode assembly 20.

The insulating case 40 includes a tab groove 41 and a tab hole 42, both of which separate the positive electrode tab 27 a predetermined distance from the negative electrode tab 29 to prevent a short circuit therebetween and serve as guides when the positive and negative electrode tabs 27 and 29 project through the insulating case 40.

The insulating case 40 may further include an injection hole 43 formed to provide a passage for smooth injection of the electrolyte into the electrode assembly 20.

Referring to FIGS. 1A to 1C, a battery pack 1 according to an exemplary embodiment of the present invention includes a bare cell 100 and a protection circuit assembly 200, which are electrically connected with each other.

As described with reference to FIG. 2, the bare cell 100 is sealed by joining an open top surface of the case 10 with the cap assembly 30.

Hereinafter, the top surface of the case 10 coupled to the cap assembly 30 is called a top surface of the bare cell 100, and the protection circuit assembly 200 may be disposed on the top surface of the bare cell 100.

Here, at the top surface of the bare cell 100, the electrode terminal 33 is disposed adjacent to an end of the bare cell 100 in a major axis direction.

FIG. 3 is an assembled cross-sectional view of a protection circuit assembly according to an exemplary embodiment of the present invention.

Referring to FIG. 3, the protection circuit assembly 200 includes a protection circuit board 210, and lead plates having a first lead plate 230 and a second lead plate 250 for electrical connection between the protection circuit board 210 and the bare cell 100.

The protection circuit board 210 may be formed by mounting a protection circuit 212, a PTC thermistor 213, an external connection terminal 214, and connection terminals having a first connection terminal 215 and a second connection terminal 216 for connecting the lead plates 230 and 250 on a printed circuit board 211.

The protection circuit board 210 further includes a terminal hole 217 formed at a location corresponding to the electrode terminal 33 of the bare cell 100, and the terminal hole 217 may be formed adjacent to an end of a long side of the printed circuit board 211.

Here, the protection circuit 212 and the PTC thermistor 213 are disposed in a middle region of the protection circuit board 210, and covered by an encapsulating part 218.

A protection circuit module 219 is formed by covering the protection circuit 212 and the PTC thermistor 213 using the encapsulating part 218.

The encapsulating part 218 may be formed of resin, for example, an organic material including a hardener and epoxy forming a three-dimensional hardening structure by being hardened due to heat, or an organic-inorganic combination material to improve mechanical and electrical performance.

The protection circuit 212 may include a circuit for controlling charge and discharge of the bare cell 100, a circuit for controlling an abnormal operation such as overcharge, overdischarge or overcurrent, and a smart circuit for providing information including available time, remaining charge time, remaining charge amount and life span of the bare cell 100.

Here, as illustrated in FIG. 1C, a lower end of the protection circuit module 219 is in contact with the cap plate 31 of the bare cell 100.

Due to the protection circuit module 219, external impact applied to a welded part between the cap plate 31 and the case 10 can be reduced.

Also, the protection circuit module 219 may be disposed on an upper surface of the cap plate 31 wherein the edge 31d of the cap plate 31 is coupled to the welded part 50 formed between the edge 31d of the cap plate 31 and the edge 11 of the opening of the case 10.

Therefore, even if there is external impact, the protection circuit module 219 serves as a support, which thus may inhibit detachment of the welded part 50.

The first lead plate 230 is connected with the first connection terminal 215 and exposed outside through the terminal hole 217, and the second lead plate 250 is connected with the second connection terminal 216.

In the battery pack 1 (FIG. 1A) according to one exemplary embodiment of the present invention, the first lead plate 230 is connected with the electrode terminal 33, and the second lead plate 250 is connected with the cap plate 31, so that the bare cell 100 is electrically connected with the protection circuit assembly 200.

Table 1 shows results of a free drop test for a conventional battery pack and a battery pack according to the exemplary embodiment of the present invention, in both of which a case and a cap plate are welded with an equal weld depth.

TABLE 1

| | | Free Drop Test | |
|---|---|---|---|
| Cycle | Weld Depth (μm) | Comparative Example | Embodiment |
| 1 | 225 | 300 | 500 |
| 2 | 237 | 400 | 500 |
| 3 | 238 | 400 | 500 |
| 4 | 242 | 400 | 500 |

TABLE 1-continued

| | | Free Drop Test | |
|---|---|---|---|
| Cycle | Weld Depth (μm) | Comparative Example | Embodiment |
| 5 | 244 | 400 | 500 |
| 6 | 246 | 400 | 600 |
| 7 | 247 | 500 | 600 |
| 8 | 256 | 500 | 600 |
| 9 | 257 | 500 | 600 |
| 10 | 259 | 500 | 600 |
| 11 | 265 | 500 | 600 |
| 12 | 267 | 500 | 600 |
| 13 | 269 | 500 | 600 |
| 14 | 271 | 500 | 600 |
| 15 | 273 | 500 | 600 |
| 16 | 275 | 500 | 700 |
| 17 | 283 | 500 | 700 |
| 18 | 285 | 500 | 600 |
| 19 | 292 | 600 | 700 |
| 20 | 296 | 600 | 800 |
| 21 | 297 | 600 | 800 |

That is, in the comparative example, after a battery pack in which a bare cell having an electrode terminal disposed in the middle of a cap plate is connected with a protection circuit board is subjected to a free drop test, generation of a crack in a welded part between a case and the cap plate is expressed in hundreds.

In the present embodiment, after a battery pack in which a bare cell having an electrode terminal disposed adjacent to an end of a cap plate in a major axis direction is formed in contact with a protection circuit module in a middle of the bare cell is subjected to a free drop test, generation of a crack in a welded part between a case and the cap plate is expressed in hundreds.

In Cycle 1, the results of the free drop test show that the battery pack in the comparative example satisfies 300 cycles, but not 400 cycles, but the battery pack in the present embodiment satisfies 500 cycles.

In Cycle 2, the results of the free drop test show that the battery pack in the comparative example satisfies 400 cycles, but not 500 cycles, but the battery pack in the present embodiment satisfies 500 cycles.

Similarly, in other cases, the battery pack in the present embodiment shows a better characteristic than that in the comparative example in the free drop test.

Of course, as shown in Table 1, as the weld depth becomes deeper, the battery pack in the present embodiment generally shows a better characteristic in the free drop test.

However, since a larger output is required in welding to further deepen the weld depth, additional equipment and cost are needed.

Further, the larger output can damage an insulating case and an electrode assembly.

The battery pack 1 according to the exemplary embodiment of the present invention may further include a shock-absorber 300 disposed between the cap plate 31 and the protection circuit module 219.

The shock-absorber 300 may be disposed to cover the welded part to reduce impact applied to the welded part between the case 10 and the cap plate 31.

The shock-absorber 300 may be a double-sided adhesive tape, and may improve adhesive strength between the cap plate 31 and the protection circuit module 219.

The battery pack 1 formed as such may further include a hard case accommodating the bare cell 100 and the protection circuit assembly 200.

Alternatively, the battery pack 1 may be subjected to tubing and labeling to cover the bare cell 100 and the protection circuit assembly 200 while the protection circuit assembly 200 is covered by an upper cover.

Consequently, a protection circuit module is in contact with a bare cell, and thus external impact applied to a welded part between a cap plate and a case can be reduced.

Further, an electrode terminal may be disposed adjacent to an end of the bare cell in a major axis direction, thereby dispersing the impact applied to the welded part between the cap plate and the case. Thus, easy detachment of the cap plate from the case due to external impact can be prevented.

Also, the welded part is not easily detached, thereby enhancing hermeticity and reliability.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack, comprising:
    a bare cell having a cap plate that defines a first surface and a first electrode that extends outward from the first surface of the cap plate and a second electrode; and
    a protection circuit assembly electrically connected with the bare cell and including a protection circuit board having a first and a second side and a protection circuit and a PTC thermistor extending outward from the second side of the protection circuit board wherein the protection circuit board is mounted between the first and second electrode so as to be positioned above the first surface of the cap plate with the protection circuit and PTC thermistor being positioned between the first and second electrode,
    wherein the protection circuit board includes a protection circuit module having an encapsulating part formed of a first material, and the encapsulating part of the protection circuit module extends from the second side of the protection circuit board towards the first surface wherein the protection circuit board and the encapsulating part define an encapsulated volume containing the protection circuit, the PTC thermistor, and an empty space that extends at least between the protection circuit and the PTC thermistor wherein the encapsulating part is supported by the first surface of the cap plate of the bare cell between the locations where the protection circuit board is connected to the first and second electrodes such that the contact of the bare cell and the protection circuit module inhibits damage to the bare cell as a result of application of external forces to the bare cell and wherein the protection circuit board is directly connected to and supported so as to be suspended over the cap plate by the electrode and the contact of the protection circuit module to the first surface of the cap plate; and
    a shock absorbing member formed of a second material different than the first material that is directly positioned on the surface of the cap plate and wherein the encapsulating part is directly in contact with the shock absorber member.

2. The battery pack according to claim 1, wherein the bare cell includes a case having an opening at one side and a cap assembly sealing the case, the cap assembly includes the cap plate that is coupled to the opening, and edges of the cap plate and the opening are welded to each other.

3. The battery pack according to claim 2, wherein the case includes narrow side surfaces facing each other and wide side surfaces facing each other, these side surfaces being laterally connected with each other, and a first surface and a second surface formed by being surrounded by the side surfaces, and a distance between the narrow side surfaces facing each other is larger than a distance between the first and second surfaces.

4. The battery pack according to claim 1, wherein the protection circuit board further includes a printed circuit board, an external connection terminal and a connection terminal which are mounted on the printed circuit board, and
the encapsulating part covers the protection circuit and the PTC thermistor so as to form the protection circuit module.

5. The battery pack according to claim 1, wherein the encapsulating part is formed of resin.

6. The battery pack according to claim 1, wherein the protection circuit module is disposed in a middle part of the protection circuit board.

7. The battery pack according to claim 2, wherein the bare cell includes a welded part formed by welding an edge of the cap plate and an edge of the opening of the case, and
wherein the protection circuit module is disposed on an upper surface of the cap plate that has the edge coupled to the welded part.

8. The battery pack according to claim 7, wherein the protection circuit module is disposed in a middle part of the cap plate.

9. The battery pack according to claim 2, wherein the cap plate includes a terminal through-hole, which is eccentrically disposed with respect to the center of the cap plate.

10. The battery pack according to claim 9, wherein the terminal through-hole is spaced from approximately the center ½ to ¾ of the distance between approximately the center and the end of the cap plate in a major axis direction.

11. The battery pack according to claim 1, wherein the shock-absorber includes a double-sided adhesive tape.

12. A battery pack, comprising:
a bare cell including a case accommodating an electrode assembly with a first and second electrode and having an opening at one side and a cap assembly sealing the case; and
a protection circuit assembly having a protection circuit board having a first and a second side with a protection circuit and PTC thermistor extending outward from the second side of the protection circuit board the protection circuit assembly being electrically connected with the bare cell,
wherein the case includes narrow side surfaces facing each other and wide side surfaces facing each other, these surfaces being laterally connected with each other, and first and second surfaces formed by being surrounded by the side surfaces,
wherein the cap assembly is coupled to the opening and includes a cap plate having a terminal through-hole,
wherein a distance between the narrow side surfaces facing each other is larger than a distance between the first and second surfaces,
wherein the terminal through-hole is eccentrically disposed with respect to the center of the cap plate
wherein the protection circuit assembly is physically supported so as to be suspended over the cap plate by the first electrode of the electrode assembly that extends through the terminal through-hole and by the second electrode and wherein the protection circuit module has an encapsulating part formed of a first material that extends outward from the second side of the protection circuit board that is supported by the cap plate between the locations wherein the protection circuit module is connected to the first and the second electrode and
wherein a shock absorbing member formed of a second material is directly positioned on the first surface of the cap plate and wherein the protection circuit board and the encapsulating part define an encapsulated volume containing the protection circuit, the PTC thermistor, and an empty space that extends at least between the protection circuit and the PTC thermistor and wherein the encapsulating part is directly in contact with the shock absorbing member.

13. The battery pack according to claim 12, wherein edges of the cap plate and the opening are welded to each other.

14. The battery pack according to claim 12, wherein the terminal through-hole is disposed adjacent to an end of the cap plate in a major axis direction.

15. The battery pack according to claim 14, wherein the terminal through-hole is spaced from approximately the center ½ to ¾ of the distance between approximately the center and the end of the cap plate in the major axis direction.

16. The battery pack according to claim 13, wherein the protection circuit assembly further includes a lead plate to electrically connect the protection circuit board with the bare cell, and
the protection circuit board includes a printed circuit board, and an external connection terminal and a connection terminal which are mounted on the printed circuit board, and the encapsulating part covers the protection circuit and the PTC thermistor.

17. The battery pack according to claim 12, wherein the protection circuit, the PTC thermistor and the encapsulating part are disposed in a middle part of the protection circuit board.

18. The battery pack according to claim 12, wherein the encapsulating part is formed of resin.

19. The battery pack according to claim 16, wherein the bare cell includes a welded part formed by welding an edge of the cap plate and an edge of the opening of the case, and
wherein the encapsulating part is disposed on an upper surface of the cap plate that has the edge coupled to the welded part.

20. The battery pack according to claim 19, wherein the encapsulating part is disposed in the middle part of the cap plate.

* * * * *